United States Patent [19]
Ensor et al.

[11] 3,805,110
[45] Apr. 16, 1974

[54] CRT HORIZONTAL DEFLECTION CIRCUIT

[75] Inventors: John W. Ensor, New Windsor; Alfred E. Popodi, Glen Burnie, both of Md.

[73] Assignee: Westinghouse Electric Corporation, Pittsburgh, Pa.

[22] Filed: Oct. 13, 1972

[21] Appl. No.: 297,296

[52] U.S. Cl. .... 315/27 R
[51] Int. Cl. .... H01j 29/70
[58] Field of Search .... 315/27–29, 315/27 R, 27 TD, 26, 25

[56] References Cited

UNITED STATES PATENTS

| | | | |
|---|---|---|---|
| 3,179,843 | 4/1965 | Schwartz | 315/27 TD |
| 3,467,882 | 9/1969 | Young | 315/27 TD |
| 3,440,485 | 4/1969 | Nix, Jr. et al. | 315/27 R |

*Primary Examiner*—Maynard R. Wilbur
*Assistant Examiner*—J. M. Potenza
*Attorney, Agent, or Firm*—C. L. O'Rourke

[57] ABSTRACT

A horizontal deflection system for a cathode ray tube (CRT) includes a deflection circuit of the resonant recovery type, and a switching circuit comprising an inductor and an emitter-follower transducer. Conduction of the emitter-follower transistor provides rapid cutoff of the horizontal output transistor at the end of a sweep interval, and charging of the inductor. The L/R ratio of the inductor is selected, in conjunction with the cutoff voltage of the output transistor, such that at the end of the retrace period, the energy stored in the inductor affords sufficient base current for driving the horizontal output transistor in saturation throughout the entire sweep interval.

9 Claims, 6 Drawing Figures

CRT HORIZONTAL DEFLECTION CIRCUIT

BACKGROUND OF THE INVENTION

1. Field of the Invention

This invention relates to the field of cathode ray tube deflection systems and, in particular, to an improved switching circuit for control of the horizontal output transistor of the deflection circuit.

2. State of the Prior Art

A magnetic deflection amplifier for a cathode ray tube (CRT) must supply a deflection current of suitable amplitude and precisely controlled duration, dependent on CRT parameters and anode voltage, to effect deflection of the CRT beam in a linear and accurately controlled manner to provide the desired raster scan of the CRT display screen. One particular type of such a deflection circuit is known in the art as a resonant recovery circuit.

A basic resonant recovery circuit is shown in FIG. 1 and includes the deflection yoke L through which passes the deflection current $I_L$. Connected in circuit with yoke L is a retrace capacitor $C_1$ and an S-curve correction capacitor $C_2$, a horizontal output transistor $Q_2$, and a damper diode CR. Inductor $L_1$ is a charging choke of high inductance. Transistor $Q_2$ is switched on and off under control of transistor $Q_1$ by control signals coupled from the output of the switching transistor $Q_1$ through transformer T to the base of horizontal output transistor $Q_2$.

Transistor $Q_1$ receives at the base thereof a succession of timing pulses which define the waveform generation intervals of the deflection circuit, corresponding to the desired rate of scan of successive lines of the raster. The operation of the circuit of FIG. 1 is explained in relation to the waveform plots of FIGS. 2A and 2B wherein are shown, as well, the timing instants $t_0$ and $t_2$.

With concurrent reference to FIGS. 1, 2A and 2B, during the second half of the sweep, i.e., the interval from $t_3$ to $t_4$ (where, for clarity, $t_4$ is both the conclusion of one sweep interval and $t_4 = t_0$ as identifying the initiation of a successive sweep interval), the horizontal output transistor $Q_2$ conducts. At time $t_4 = t_0$, the deflection $I_L$ attains its positive peak value. The transistor $Q_2$ is cut off at time $t_0$ as the retrace period begins. The stored energy in the yoke inductance L produces a rapid voltage build-up of sinusoidal form and several hundred volts magnitude across the small retrace capacitor $C_1$. This retrace pulse is shown in FIG. 2B. As noted, the retrace pulse is basically sinusoidal and, in accordance with circuit parameters, the voltage $V_{C1}$ builds to a maximum and then reduces through zero volts at a time $t_1$.

At time $t_1$, diode CR begins to conduct and the actual sweep begins. The sweep particularly is designated by the linear portion of the deflection current $I_L$, from time $t_1$ through time $t_4$. This deflection current $I_L$ passes through zero as shown in FIG. 2A at time $t_3$ and thus undergoes an effective reversal of current polarity. At time $t_3$, therefore, diode CR extinguishes or terminates conduction, and the output transistor $Q_2$ initiates conduction and supplies the deflection current $I_L$ for the second half of the sweep interval, and thus from time $t_3$ to $t_4$ as before noted.

From the foregoing, it will be appreciated that the switching transistor $Q_1$ and transformer T must perform two basic functions. The first basic function is that of cutting off conduction of transistor $Q_2$ precisely at time $t_0$. The second function is that of providing sufficient base drive for the output transistor $Q_2$ during the conduction interval thereof, and thus from time $t_3$ to $t_4$, to assure that transistor $Q_2$ remains safely saturated.

In effecting these functions, the switching pulses supplied to transistor $Q_1$ cause the latter to conduct from the time $t_0$ to time $t_2$ and to be cut off from time $t_2$ to time $t_4$ (i.e., $t_4 = t_0$). Thus, from time $t_2$ to time $t_4$, transistor $Q_1$ is cut off and the stored energy in the inductance of tranformer T supplies the base current for the horizontal output transistor $Q_2$ during its conducting interval and particularly from $t_3$ to $t_4$. The base drive for the output transistor $Q_2$ must be applied before the initiation of its conduction interval and thus prior to time $t_3$. Turn on of transistor $Q_2$ preferably should be effected gradually to avoid discontinuities in the waveform of the deflection current $I_L$.

The efficiency and reliability of a deflection circuit as shown in FIG. 1 depends substantially on the quality and effectiveness of the aforedescribed switching operation. Particularly where large amplitude deflection currents are required, rapid turn-off of transistor $Q_2$ (at time $t_4 = t_0$) is difficult to achieve due to the storage time and the finite current fall-off time inherent in the characteristics of a power transistor such as transistor $Q_2$. Too slow turn-off, under these conditions particularly, results in excessive heat dissipation and reduced reliability even where expensive transistors are employed. The driver circuit for the output transistor $Q_2$ not only must supply the large reverse base current required for rapid turn-off of transistor $Q_2$, but also must supply the forward base current during the time interval $t_2$ to $t_4$. This function as well is difficult to achieve and places constraints on the design of the transformer T since the maximum negative voltage supplied at the base of transistor $Q_2$, which occurs when transistor $Q_1$ is turned on, must not exceed the rated maximum base to emitter reverse voltage of the output transistor $Q_2$.

The aforenoted constraints and requirements inherent in the design of a switching circuit for a CRT deflection circuit are overcome by the improved deflection circuit of the invention which, while considerably simplified and affording a substantial reduction in component cost, provides faster, more precise and more reliable operation.

SUMMARY OF THE INVENTION

In accordance with the invention, the switching circuit for a horizontal output transistor in a horizontal deflection circuit comprises an inductor connected between ground and the base of the horizontal output transistor and an emitter-follower switching transistor connected between the base and the negative voltage supply terminal. The inductance to resistance ratio of the inductor is selected such that its stored energy $W = LI^2_{max}/2$, where L is the value of inductance and $I_{max}$ is the maximum level of charging current supplied to the inductor, provides sufficient base drive current to the horizontal output transistor to maintain the latter conducting in saturation during the sweep period. To initiate the retrace interval, a constant voltage of a suitable value is applied to the inductor and to the base of the output transistor by enabling conduction of the emitter-follower transistor. This operation provides for both the flow of charging current in the inductor to establish the stored energy, and, as well, rapid turn-off of the output transistor. The current in the inductor increases approximately linearly during this charging interval until the emitter-follower transistor is switched off by control pulses applied to its base, at which time the stored energy of the inductor supplies the required base current for the horizontal output transistor. During this latter interval, the current from the inductor decays from a maximum to a minimum value; that minimum value, however, must be of a level which maintains the output transistor in saturation throughout the entire sweep period. Since the collector current of the output transistor is highest at the end of the sweep, corresponding to the minimum base current supplied from the inductor, the maximum value of the inductor current and hence the level of energy to be stored in the inductor is a function of that necessary minimum current value at the conclusion of the sweep interval.

A switching circuit designed in accordance with the invention affords considerable simplification over prior art circuits, particularly in the elimination of the coupling tranformer as required in prior art circuits. By proper selection of the inductance to resistance ratio in conjunction with the base turn-off voltage of the output transistor, the stored energy which may be developed in the inductor is more than adequate to supply the base current required for the horizontal output transistor, even where the latter is of low current gain. The emitter-follower transistor as well affords more rapid turn-off of the output transistor, with a resultant decrease of power dissipation therein. Forward base drive for the output transistor is applied at the initiation of the sweep in the circuit of the invention and thus no discontinuity in the deflection current waveform is experienced. The improved switching circuit of the invention as well permits the use of less expensive transistors for the output transistor. Furthermore, undesirable ringing caused by the leakage inductance of the coupling transformer is avoided.

DETAILED DESCRIPTION OF THE INVENTION

Figure 1:
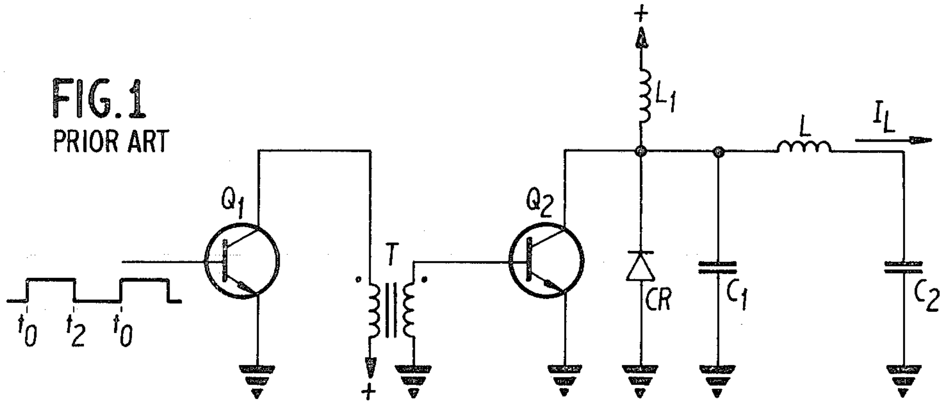
FIG. 1 PRIOR ART
FIG. 1 is a schematic of a prior art horizontal deflection circuit of the resonant recovery type and employing a conventional input switching circuit.

A prior art resonant recovery-type circuit having a conventional switching control circuit has been shown in FIG. 1 and discussed above. Stated very generally, the purpose of the present invention is to simplify and improve upon the switching control circuit for the deflection circuit, particularly permitting replacing the coupling transformer with an inductor and employing an emitter-follower transistor to provide the switching control function.

Figure 3:
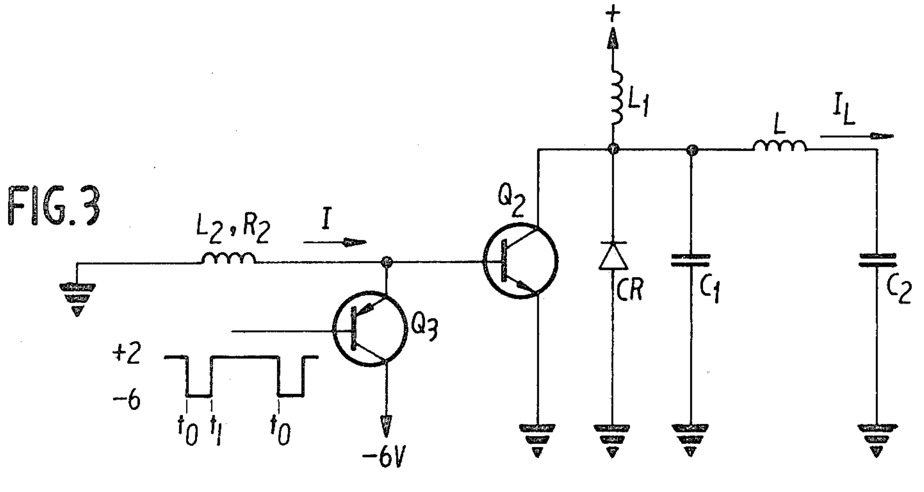
FIG. 3 is a schematic of a horizontal deflection circuit of the resonant recovery type employing the improved switching circuit of the invention.

In FIG. 3 is shown a circuit schematic of a horizontal deflection circuit employing the improved switching circuit of the invention. The basic deflection circuit again includes the deflection yoke L which conducts the deflection current $I_L$, the retrace capacitor $C_1$, S-curve correction capacitor $C_2$, the output transistor $Q_2$, damper diode CR, and the charging choke L1, as shown and described in relation to FIG. 1. The switching circuit for the output transistor $Q_2$ in accordance with the invention comprises an inductor $L_2$ having a DC resistance $R_2$ as there illustrated, and an emitter-follower transistor $Q_3$ connected at its emitter to the base of transistor $Q_2$ and at its collector to a negative supply terminal, illustratively at −6 volts. Emitter-follower transistor $Q_3$ receives at its base, control pulses generally of square wave configuration and defining the timing instants $t'_0$, $t'_1$, $t'_0$. . . . Illustratively, the control pulses may be of the amplitude value shown.

Figure 2A:
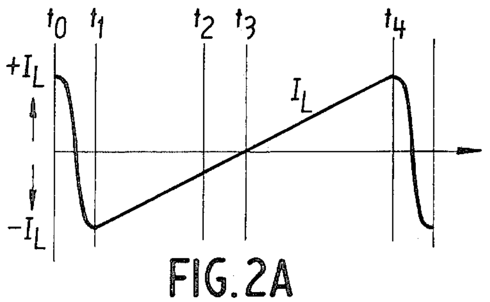
FIG. 2A is a waveform plot illustrating the deflection current waveform generated by the circuit of FIG. 1.
Figure 4A:
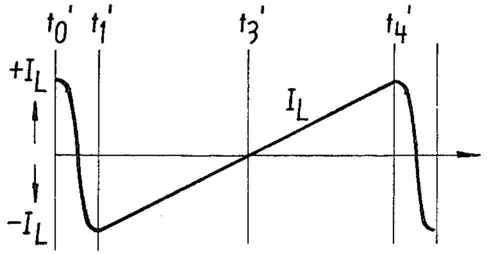
FIG. 4A is a waveform plot of a deflection current developed in the circuit of FIG. 3.
Figure 4B:
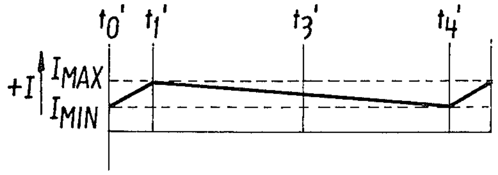
FIG. 4B is a waveform plot of the current in the energy storage inductor of the switching circuit of the invention.
Figure 2B:
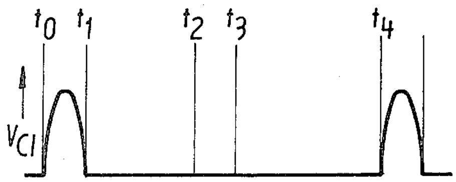
FIG. 2B is a waveform plot illustrating retrace pulses developed in the circuit of FIG. 1.

In FIG. 4A is shown the deflection current waveform produced in the deflection yoke L of the circuit of FIG. 3 and which, it will be appreciated, corresponds to the current waveform of FIG. 2A. In FIG. 4B is shown the waveform of the current I flowing in the inductor $L_2$. It will be understood that a retrace pulse is produced in the retrace capacitor $C_1$ as illustrated in FIG. 2B.

In operation, and to initiate retrace, a constant voltage is applied to the inductor $L_2$ and to the base of the output transistor $Q_2$ by conduction of the emitter-follower transistor $Q_3$; as illustrated in FIG. 3, the constant voltage is substantially that provided by the reference terminal of −6 volts.

In the operation of the switching circuit of the invention as shown in FIG. 3, to initiate retrace, transistor $Q_3$ is rendered conductive by the input pulse supplied to the base thereof at time $t'_0$ and remains conductive until the termination of the negative pulse at time $t'_1$. Transistor $Q_3$ conducts heavily during this period, clamping the base of transistor $Q_2$ to the negative reference potential, resulting in rapid turn-off of transistor $Q_2$, from a previously high level conducting state. Conduction of transistor $Q_3$ also produces a flow of charging current in the inductor $L_2$, that current rising approximately linearly towards the value $I_{max}$ at time $t'_1$ when the negative control pulse to the base of transistor $Q_3$ terminates, rendering the latter non-conductive. The current I then decays during the time interval from $t'_1$ to $t'_4$.

The current level $I_{min}$ must be equal to or greater than the base current necessary to maintain transistor $Q_2$ conducting in saturation; note particularly that at time $t'_4$, the collector current of transistor $Q_2$ is at its maximum value. Thus, the value of $I_{max}$ is determined as a function of the value $I_{min}$, the latter being required to be of a level to maintain transistor $Q_2$ in saturation at the end of the sweep.

As is well known, the stored energy in an inductor is defined as follows:

$$W = L_2 I^2_{max}/2$$

where $L_2$ is the inductance value of inductor $L_2$. Resistance R is the total resistance of the drive circuit, and by proper selection of the $L_2/R$ ratio in conjunction with base turnoff voltage of the output transistor $Q_2$, the stored energy W may be assured to be more than adequate to supply the necessary base current for the output transistor $Q_2$, even where the latter is of relatively low current gain. The value of the turn-off voltage for transistor $Q_2$, as is well known, is limited by the maximum reverse base-to-emitter voltage rating of the transistor $Q_2$. The value of the negative reference voltage to which the emitter-follower transistor is connected thus is determined as to its maximum value in accordance with that voltage rating of the transistor $Q_2$. The value of the reference voltage also is determined, in relation to $R_2$ and $L_2$, to assure the requisite maximum and minimum current levels in the inductor for developing the necessary stored energy to provide the base drive current to the output transistor $Q_2$.

A comparison of the improved circuit of FIG. 3 with the prior art circuit of FIG. 1 demonstrates readily the considerable simplification of the switching circuit afforded by the invention. Note particularly that in the prior art circuit, the coupling transformer must first deliver the high negative base drive to assure rapid turn-off of output transistor $Q_2$, yet at a safe voltage level in view of the rated maximum base-to-emitter reverse voltage of transistor $Q_2$, during the retrace time; conversely, the transformer T must also provide a large positive base current during the sweep interval. Designing a transformer which can satisfy such stringent requirements in alternative conditions of operation is quite difficult and results in a relatively complex and expensive transformer. By constrast, the circuit of the invention, through the relatively simple expedient of selection of the appropriate $L_2/R$ ratio, affords the stored energy necessary to supply a base current to the output transistor $Q_2$, even for an output transistor having low current gain. The emitter-follower transistor $Q_3$, which serves to develop the current flow in the inductor $L_2$, also provides direct control for rapid turn-off of the output transistor $Q_2$, resulting in lower power dissipation in the latter.

A salient feature of the invention furthermore is that the switching circuit of the invention provides a forward base drive to the output transistor $Q_2$ at the initiation of the sweep, i.e., at time $t'_1$, avoiding any discontinuity in the deflection current waveform, a problem attendant the operation of the prior art circuit of FIG. 1 at the time that transistor $Q_2$ is switched into conduction. Furthermore, in practical applications of a deflection circuit employing the improved switching circuit of the invention wherein stringent operating requirements are not imposed, the diode CR can be omitted and its function performed instead by the base-collector junction of the output transistor $Q_2$; this result may be realized since the improved switching circuit of the invention affords greater drive capability. It also permits the use of less expensive output transistors for fulfilling the function of the transistor $Q_2$ than can be employed in prior art circuits.

Numerous modifications and adaptations of the improved switching circuit for a horizontal deflection output circuit in accordance with the invention will be apparent to those skilled in the art and thus it is intended by the appended claims to cover all such modifications and adaptations which fall within the true spirit and scope of the invention.

What is claimed is:

1. In a horizontal deflection system for a cathode ray tube including a deflection circuit having an output transistor for conducting the deflection current supplied to the yoke winding of the cathode ray tube during at least a part of the sweep interval, a switching circuit for controlling the energization of the deflection circuit, comprising:

an inductor connected between an input terminal of the deflection circuit and a first reference potential terminal, a switching element connected between said input terminal of the deflection circuit and a second reference potential terminal, said switching element in a first, conducting condition, connecting said input terminal to said second reference potential terminal for rendering said output transistor of said deflection circuit non-conductive, and establishing a current flow between said first and second reference potential terminals for charging said inductor, and said inductor storing energy therein during the charging current flow and, in a second non-conducting condition of said switching element, supplying the stored energy to the input terminal of said deflection circuit to drive said output transistor in conduction to establish a deflection current in said yoke winding.

2. A switching circuit as recited in claim 1, wherein the energy stored in the inductor upon termination of conduction of said switching element is in accordance with:

$$W = LI^2_{max}/2$$

wherein $I_{max}$ is the maximum level of current flow through said inductor and L is the value of inductance of the said inductor.

3. A switching circuit as recited in claim 2, wherein said inductor supplies the energy stored therein as a current level decreasing from a value $I_{max}$ to a value $I_{min}$ during the second non-conducting condition of said switching element and wherein $I_{min}$ is adequate to drive said output transistor in saturated conduction.

4. A switching circuit as recited in claim 1, wherein the base terminal of said output transistor is said input terminal of said deflection circuit.

5. A switching circuit as recited in claim 4, wherein said switching element comprises a transistor connected in emitter-follower configuration in its emitter-collector path between said input terminal and said second reference potential terminal.

6. A switching circuit as recited in claim 1, wherein the horizontal deflection system comprises a resonant recovery system and wherein:

the base of said output transistor includes said input terminal of said deflection circuit, said yoke winding is connected in series circuit with the collector-emitter conduction path of said output transistor, and said switching element comprises a transistor of opposite polarity to said output transistor and connected in emitter-follower configuration between the base electrode of said output transistor and said second reference potential terminal.

7. A switching circuit as recited in claim 6, wherein the amplitude and polarity of the second reference potential are selected for effecting rapid cut-off of conduction of said output transistor.

8. A switching circuit as recited in claim 7, wherein the ratio of the inductance L of the inductor to the total resistance R of the drive circuit is selected in conjunction with the base turn-off voltage of said output transistor whereby the stored energy:

$$W = LI^2_{max}/2$$

developed in said inductor during the first conducting condition of said emitter-follower transistor is sufficient to supply a base current to said output transistor of a value to maintain conduction thereof in saturation throughout the sweep interval.

9. A switching circuit as recited in claim 8, wherein the collector-base junction of said output transistor operates as a current conducting diode poled for conduction in a direction opposite to that of the collector-emitter path of the output transistor during at least a portion of the sweep interval.

* * * * *